Figure 4:
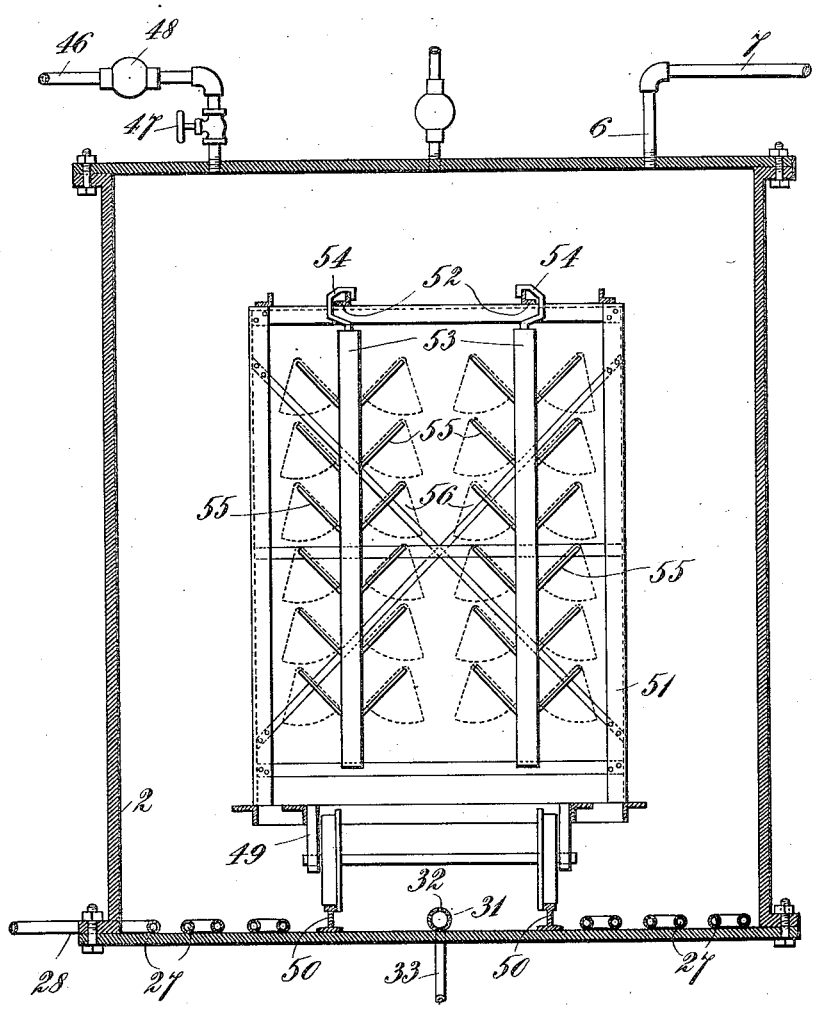

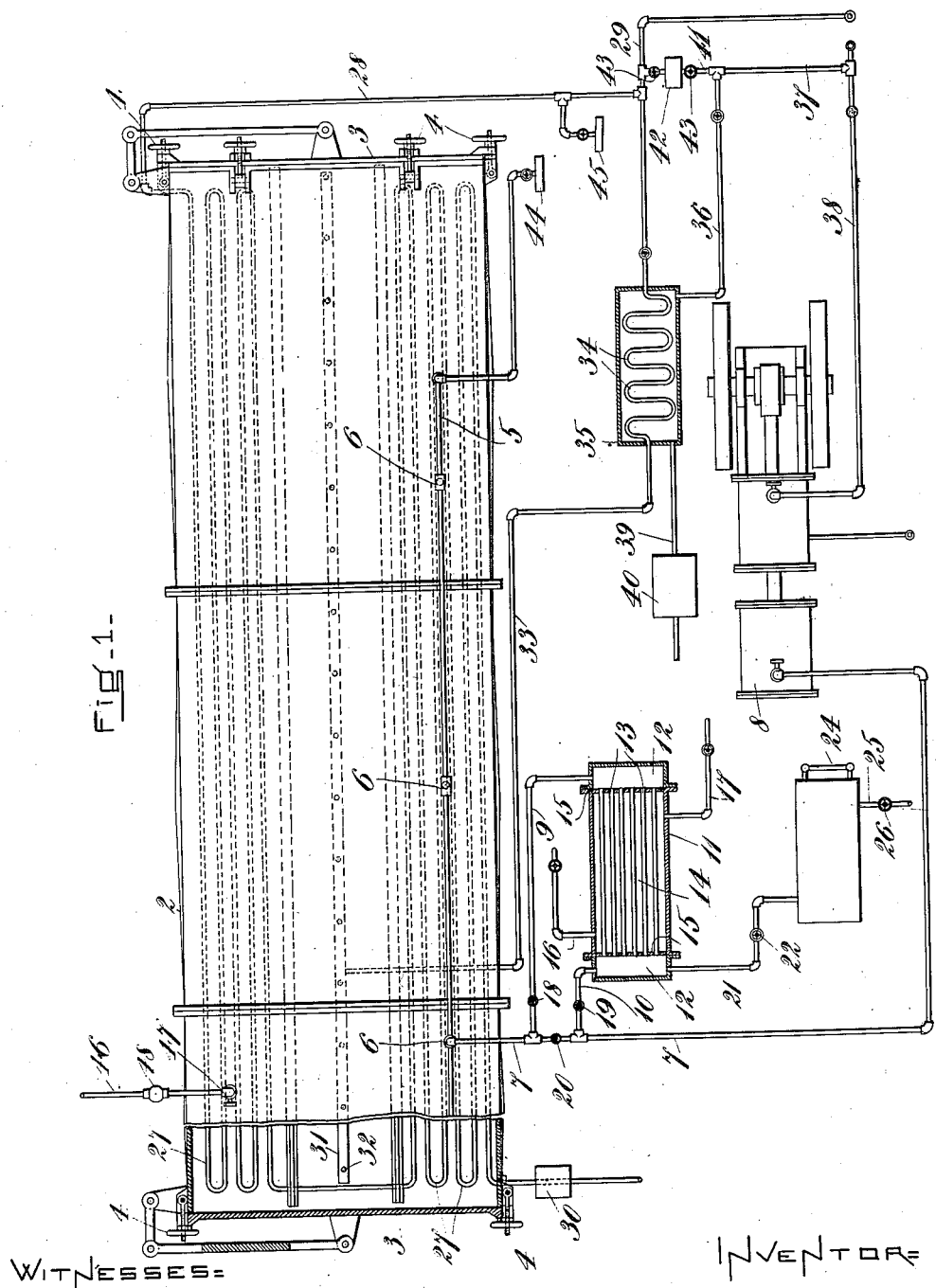

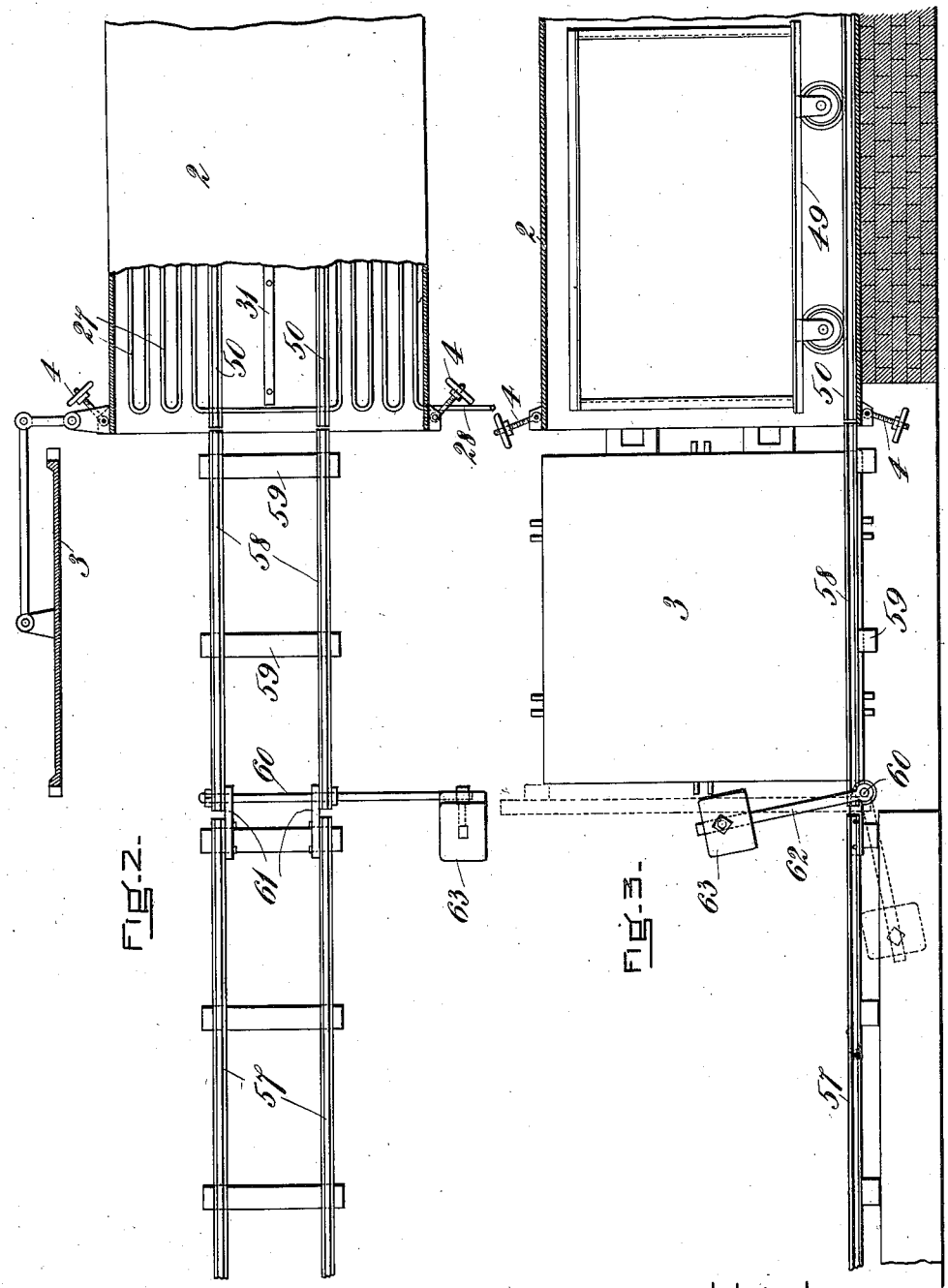

UNITED STATES PATENT OFFICE.

JOHN H. DERBY, OF NEW YORK, N. Y.

PROCESS OF AND APPARATUS FOR TREATING FUR-HAT BODIES.

1,123,113.   Specification of Letters Patent.   Patented Dec. 29, 1914.

Application filed December 6, 1909. Serial No. 531,495.

*To all whom it may concern:*

Be it known that I, JOHN H. DERBY, a citizen of the United States, residing at New York, in the county of New York and State of New York, have invented new and useful Improvements in Processes of and Apparatus for Treating Fur-Hat Bodies, of which the following is a specification.

In the manufacture of fur hats the bodies are coated, as one of the steps of the process of manufacture, with a solution of shellac in alcohol, and after this has been done the coated bodies are dried by evaporating the alcohol therefrom. In drying these coated hat bodies it is desirable, for the sake of economy, to conduct the operation in such manner as to recover the alcohol evaporated therefrom, so that it may be used over again, and this result has heretofore been accomplished to a certain extent, but in a manner which has involved considerable danger of injury to person or property by explosion of the alcohol vapor mixed with air, has been expensive on account of the amount of time required, and has also been effective in recovering the alcohol in a quite dilute form only, and my invention, while adaptable to other uses, is particularly intended to overcome the objections to the methods and apparatus which have heretofore been employed for the purpose above referred to.

According to my invention as utilized in connection with the manufacture of fur hats, the hat bodies after being coated with the shellac solution are placed in a chamber which is then tightly closed and from which the air is then largely exhausted. Heat is then applied to the bodies and the alcohol vapor is thereby evaporated therefrom, which vapor is withdrawn through a suitable condenser where it is liquefied and from which it may be withdrawn and subsequently used over again for the same purpose. The process just described is preferably carried out by means of an apparatus which forms a part of my invention and which is so constructed and arranged that after the hat bodies have been dried in the manner above indicated, they may be steamed by means of the same apparatus until they have been sufficiently softened, and then heated once more until the moisture absorbed from the steam has been partially dried out, leaving the bodies soft and in suitable condition to undergo subsequent operations.

In the accompanying drawings:—Figure 1 is a plan view, partly in section, of my apparatus as preferably constructed for the particular purpose above referred to, except that certain accessory appliances hereinafter described are omitted from this figure. Figs. 2 and 3 are respectively a plan view and a side elevation, each partly in section, of one end of the chamber shown in Fig. 1 and certain adjacent parts, and Fig. 4 is a transverse section through the aforesaid chamber, showing a load of hat bodies therein.

Referring to the drawings, 2 indicates a chamber of suitable size to receive as many hat bodies as it is desired to treat at one operation, the walls of this chamber being of sufficient strength to resist the external atmospheric pressure when the gaseous contents of the chamber are sufficiently withdrawn, as hereinafter described. This chamber is provided, preferably at each end, with a door 3 which may be opened to permit the introduction and removal of the hat bodies, and is provided with a number of suitable clamps 4 whereby it may be held tightly closed, so that the entrance of air to the chamber 2 will be effectively prevented.

5 indicates a pipe extending along the top of the chamber 2 and connected at intervals with the interior of the latter by means of branch pipes 6.

An exhaust pipe 7 leads from the pipe 5 to a vacuum pump 8, and from said pipe 7 branches 9 and 10 lead to and from a condenser of any suitable construction, which condenser is shown as consisting of a casing 11 having at its ends spaces 12 into which the branch pipes 9 and 10 open respectively and which communicate with each other through tubes 13 extending through a water chamber 14, said chamber being located within the casing 11 between heads 15 which carry the tubes 13, and provision being made for circulating cold water through the chamber 14 by means of water supply and discharge pipes 16 and 17 respectively.

Hand-operated shut-off valves 18 and 19 are included in the branch pipes 9 and 10 respectively, in order that the condenser may be cut out if desired in which case that portion of the exhaust pipe 7 which extends between the branch pipes 9 and 10 will serve as a by-pass pipe, being provided with a valve 20 which is closed when the valves 18 and 19 are open, and is opened when said valves are closed.

A pipe 21 provided with a shut-off valve 22 leads from the condenser to a receiving tank 23, which tank is shown as provided with a gage 24 and with a draw-off pipe 25 controlled by a valve or cock 26.

For supplying heat to the interior of the chamber 2 I prefer to employ a series of steam coils 27 extending horizontally on the bottom of the chamber 2 and connected by a pipe 28 passing through the wall of the chamber to a steam supply pipe 29. Exhaust steam may be used for this purpose, and the steam coils 27 may discharge into a steam trap 30. I also provide means for discharging steam into the chamber 2, consisting, in the construction illustrated, of a pipe 31 preferably extending longitudinally along the bottom of the chamber and provided with a number of perforations 32, and a pipe connection 33 leading out through the wall of the chamber to the steam supply pipe 29. Said pipe 33 preferably includes a superheater for drying the steam which passes through it, which superheater may consist of coils 34 inclosed in a casing 35 to which live steam is led through a pipe 36 from another pipe 37 connected to a source of supply, such as the steam pipe 38 which feeds the power cylinder of the vacuum pump 8. The outlet 39 from the casing 35 leads to a steam trap 40.

In the arrangement illustrated, I have shown the pipes 33 and 36 as connected by a by-pass pipe 41 containing a reducing valve (indicated diagrammatically at 42) and controlled on both sides of the reducing valve by shut-off valves 43, whereby, in case a supply of exhaust steam is not available, live steam from the boiler may be brought down to a suitable pressure and supplied through the pipe 33 to the heating coils 27.

44 and 45 indicate pressure gages adapted respectively to indicate the amount of vacuum in the chamber 2 and the steam pressure in the heating coils 27, and 46 indicates a pipe leading into the chamber 2 and provided with a shut-off valve 47, whereby air may be admitted to said chamber. An inwardly-opening relief valve, indicated diagrammatically at 48, is preferably included in the pipe 46, which relief valve is adjusted to open in case the pressure in the chamber 2 falls below the desired minimum.

As thus constructed, the apparatus operates as follows: Assuming that a number of coated hat bodies have beeen placed within the chamber 2 and the doors to said chamber have been tightly closed, the vacuum pump 8 is operated and air is exhausted from said chamber 2 until the pressure therein is reduced, preferably, to about three pounds absolute. During this operation the condenser 11 may be cut out and the air removed through the by-pass portion of the pipe 7. After this has been done, steam is turned into the coils 27 and the contents of the chamber 2 are thereby heated, thus drying the hat bodies by driving off the alcohol vapor from the shellac solution with which they were coated. During this part of the operation the vapors withdrawn are led through the condenser 11 and the alcohol is thereby condensed into a liquid, which flows into the receiving tank 23. From this tank the liquid alcohol may be withdrawn as desired, and distilled or rectified if necessary, whereupon it may be used over again for the same purpose. After the hat bodies have been freed from alcohol as above described, dry steam is admitted to the chamber 2 through the perforated pipe 31 and the hat bodies, which have been rendered hard and brittle by the previous drying process, are thereby softened, the object of superheating the steam employed for this purpose being to keep the hat bodies as dry as possible. By this step in the process the hat bodies are softened, so that they become pliable and will not crack, and after the steaming process has been completed steam is admitted once more to the heating coils 27 and the moisture in the hat bodies which has been absorbed from the steam, is partially dried out, leaving the bodies ready for subsequent operations. This drying process may be expedited by operating the vacuum pump. The normal atmospheric pressure is then reëstablished in the chamber 2, its doors are opened and the hat bodies are removed.

In order to provide for the convenient treatment at one time of large number of hat bodies, I have devised a carrying and suspending apparatus consisting of a wheeled truck 49 adapted to travel on rails 50 laid along the bottom of the chamber 2, which truck carries an open framework 51 provided at its top with horizontal bars 52 on which are suspended a number of upright supports 53 by means of hooks 54 at their respective upper ends. Each of the supports 53 has a number of pins 55 radiating outward and upward therefrom and so arranged that each pin is adapted to carry a hat body 56 and expose it to the heating and steaming agencies. These supports are severally loaded with the hat bodies at any suitable point in the factory, are then hung upon the bars 52, and the truck thus loaded is then pushed up to and into the chamber 2 along rails 57 which extend from the ends of the chamber to any desired points. In the construction illustrated the rail sections 58 which are located adjacent to the ends of the chamber 2 are movable out of the path of the doors 3 when it is desired to open or close the latter, being shown in Figs. 2 and 3 as carried and connected by cross-ties 59 and by a transversely-extending rod 60 pivotally mounted in fixed brackets 61, so that the sections 58 can be swung from a horizontal to a vertical position. The rod 60 is provided with an upwardly-extending arm 62 carrying a counterweight 63 which substantially counterbalances the rail sections 58, the arrangement being such that when these sections are elevated into the position shown in dotted lines in Fig. 3 they will be held in this position by the counterweight 63 and will be out of the path of the door 3, so that the latter may then be opened or closed. When the door 3 is open, however, the rail sections 58 may be lowered into the position shown in full lines in Fig. 3, in which position their free ends extend slightly into the chamber and substantially abut against the ends of the rails 50, their weight being sufficient to hold them down since the counterweighted arm 62 is at this time in a nearly vertical position, as shown.

Assuming that the doors 3 are open and that the rail sections 58 are in their lowered position shown in Fig. 2, as many of the loaded trucks 49 as the chamber 2 will hold may be pushed along the tracks thus provided and into the chamber, and in case the chamber contains trucks loaded with hat bodies which have previously been treated therein, the latter trucks will be pushed out of the chamber by the entering trucks and may then be moved along the rails to any desired point. The arrangement above described is advantageous not only because it provides for supporting and handling a large number of hat bodies at one time and in a convenient manner, but also because it renders it unnecessary for the operatives to enter the chamber 2, either to place the hat bodies therein or to remove the same, so they are not exposed to the injurious effect of the alcohol vapor which is evaporated from the hat bodies.

It is an important feature of my invention that it eliminates all danger of explosion of the alcohol vapor, since the chamber 2 is closed and the air is practically exhausted therefrom before the alcohol is evaporated from the hat bodies, and after this evaporation has commenced the chamber cannot be opened again, on account of the external air pressure against the doors, until the process has been completed. My apparatus also serves for steaming the hat bodies after the alcohol has been removed, and also for drying the hat bodies after they have been steamed, so that the alcohol-recovering, hat-steaming and hat-drying operations are all accomplished by means of one apparatus without any intermediate handling of the hat bodies.

I claim as my invention:

1. The herein described process of treating articles containing a volatile solvent which consists in inclosing said articles in a chamber, exhausting air from said chamber, heating the articles in the chamber while subjected to the vacuum therein, withdrawing the vaporized solvent from the chamber, introducing dry steam into the chamber to soften the articles, and then heating the articles a second time while in said chamber.

2. The herein described process of treating articles containing a volatile solvent which consists in inclosing said articles in a chamber, exhausting air from the chamber, heating the articles in the chamber while subjected to the vacuum therein, introducing dry steam into the chamber to soften the articles, again exhausting the gaseous contents from the chamber, and heating the articles a second time while subjected to the vacuum in the chamber to drive off all moisture from the articles.

3. The herein described process of treating hat bodies, which consists in inclosing the same in a chamber while freshly coated with a solution containing a volatile solvent, exhausting air from the chamber, then heating the contents of the chamber and thereby vaporizing said solvent, withdrawing the vaporized solvent from the chamber, then admitting steam to the chamber until the hat bodies are softened, and finally shutting off the steam supply and heating the contents of the chamber once more until the same are sufficiently dried.

4. An apparatus of the character described comprising a chamber adapted to receive articles to be treated, independently operating means for heating the contents of the chamber and for establishing a substantial vacuum in said chamber by withdrawing the gaseous contents therefrom, a separating condenser adapted to receive vapors from the articles treated and means for admitting dry steam to said chamber.

5. An apparatus of the character described, comprising a chamber for the reception of articles containing a volatile solvent, independently-operating means for heating the contents of the chamber and for establishing a substantial vacuum in said chamber by withdrawing the gaseous contents therefrom, a condenser for the reception of the vaporized solvent, a perforated pipe located in the chamber and adapted to discharge dry steam into the same, and means associated with the condenser for collecting the volatile solvent when withdrawn from the chamber and condensed.

6. In an apparatus of the character described, the combination of a chamber, an exhaust pipe leading therefrom and comprising two branches controlled by independent valves, one of which branches includes a condenser, a vacuum pump connected to the exhaust pipe, steam-heating coils located within the chamber, means for controlling the admission of steam thereto, and means for supplying steam to the interior of the chamber.

7. In an apparatus of the character described, the combination of a chamber, an exhaust pipe leading therefrom and comprising two branches controlled by independent valves, one of which branches includes a condenser, a vacuum pump connected to the exhaust pipe, steam-heating coils located within the chamber, means for controlling the admission of steam thereto, means for supplying exhaust steam to the interior of the chamber, and means for superheating the exhaust steam before it is admitted to the chamber.

8. In an apparatus of the character described, the combination of a chamber, steam-heating coils contained therein, pipe connections between said coils and a supply of exhaust steam, a steam pipe contained in said chamber and opening directly into the same, pipe connections between said steam pipe and the supply of exhaust steam, a superheater included in said pipe connections and means for supplying live steam thereto, pipe connections extending from the live steam pipe to the exhaust steam pipe and including a reducing valve, and valves controlling said pipe connections.

9. In an apparatus of the character described, the combination of a chamber, steam-heating coils contained therein, pipe connections between said coils and a supply of exhaust steam, a steam pipe contained in said chamber and opening directly into the same, pipe connections between said steam pipe and the supply of exhaust steam, a superheater included in said pipe connections and means for supplying live steam thereto, pipe connections extending from the live steam pipe to the exhaust steam pipe and including a reducing valve, valves controlling said pipe connections, a vacuum pump, an exhaust pipe leading from the interior of the chamber to the vacuum pump, and a condenser adapted to be included in the exhaust pipe.

In testimony whereof, I have hereunto subscribed my name this 27th day of November, 1909.

JOHN H. DERBY.

Witnesses:
   Chas. W. Stevens,
   Edna M. Denton.